April 23, 1940.   T. J. ATKINS   2,198,449
REPASS AIR CONDITIONING SYSTEM
Filed Nov. 13, 1937
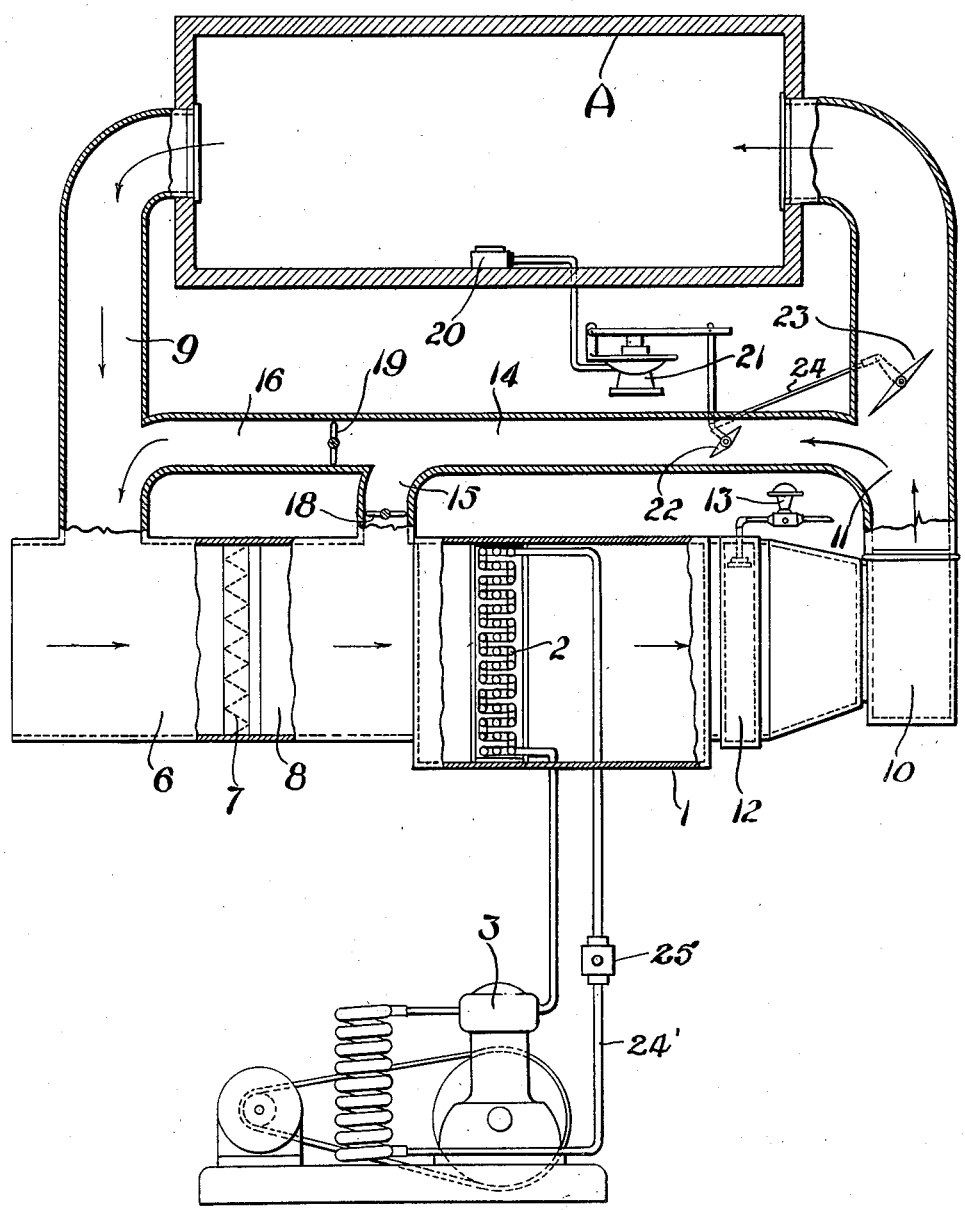
T. J. ATKINS
INVENTOR
BY *Robt Meyer*
ATTORNEY Patented Apr. 23, 1940

2,198,449

UNITED STATES PATENT OFFICE 2,198,449

REPASS AIR CONDITIONING SYSTEM

Thomas J. Atkins, East Orange, N. J., assignor to Worthington Pump and Machinery Corporation, Harrison, N. J., a corporation of Delaware Application November 13, 1937, Serial No. 174,343

7 Claims. (Cl. 62—6)

This invention relates to air conditioning apparatus and/or systems and an object of the present invention is to provide a new and improved method and apparatus for conditioning in a given space under varying conditions of room load and outside air load; a system of air conditioning whereby the design and size of the cooling element can remain constant within a wider range of load characteristics than is possible with approved air conditioning systems and apparatus heretofore available thereby providing such a system which adapts itself to more nearly standardized manufacture; and also to provide a system wherein characteristics of the cooling element will vary with the load characteristics.

More specifically the present invention comprises a method or system of air conditioning, an object of which is to provide means for effectively improving the efficiency of the cooling coil or air conditioning means of the apparatus, whereby the effective coil depth in the direction of air flow of the cooling or refrigerant coil or coils will be automatically regulated to maintain the desired temperature and humidity in the enclosure treated without resorting to lower refrigerant temperature and without the resultant increase in operating cost.

Another object of the present invention is to provide a method and apparatus for conditioning air in an enclosure, whereby the apparatus or conditioning units may be manufactured in standard sizes and will have a wide range of effective operation, whereby the units may be production manufactured and a standard unit of a given size will effectively and properly condition rooms of various sizes within certain limits, without requiring alteration to the apparatus; thereby eliminating the present costly practice of individual manufacturing of units for each size of room.

With these and other objects in view as may appear from the accompanying specification, the invention consists of various features of construction and combination of parts, which will first be described in connection with the accompanying drawing showing a diagrammatic view partly in section of an air conditioning apparatus constructed in accordance with the present invention, and the features forming the invention will be specifically pointed out in the claims.

In the drawing, an enclosure or room A is shown which is to receive the conditioned air and as is the principal object of all air conditioning systems and apparatus it is desired to maintain the temperature and humidity of the air in the enclosure A constant within limits under varying conditions, and the present invention comprehends the use or employment of a system and apparatus which will provide this desired result with a minimum expenditure and which is so constructed and designed that a certain degree of standardized manufacture may be resorted to in that the apparatus will function effectively for various load characteristics and various sized enclosures which are subjected to different load conditions, within a predetermined range, permitting the use of the same apparatus for either different sized enclosures or enclosures operating under different conditions and requiring different quantities of air at different temperatures, while at the same time maintaining the coil efficiency near its highest point even though the cooling work in room A is greatly reduced. Standard manufacture may be resorted to in that the apparatus will function effectively for various load characteristics of various size enclosures which are subjected to different load conditions within a predetermined range.

The apparatus comprises the housing 1 in which is positioned the cooling or refrigerant coil 2 of any approved type, through which the refrigerant is circulated from the compressor 3. The fresh air to be treated enters through the duct 6, and passes through a filter 7 of any approved construction, through the space or chamber 8 in the duct 6 and from thence into the housing 1. However, prior to the entrance of the air into the housing 1 for treatment, the fresh air entering the duct 6 is mixed with return air which returns from the enclosure A through a closed duct 9 and mixed with the incoming fresh air outwardly of the filter 7. After the air has been treated in the housing 1 it is drawn therefrom by a fan 10, in the usual manner and discharged into the supply duct 11 which delivers the treated air to the enclosure A. A heater 12 of any approved construction is placed between the housing 1 and the fan 10 or at any other suitable location in the unit for the purpose of heating the air and operation or this heater is controlled by a control valve 13.

A repass or return duct 14 communicates with the supply duct 11 between the fan 10 and the enclosure 8 and this repass duct has a branch 15 which opens into the chamber or space 8 between the filter 7 and the housing 1 and a second outlet 16 which opens into the return duct 9 so that the repassed air may enter the duct 6 either outwardly of the filter 7 for mixing with the return air returning from the enclosure A prior to the mixture of this air with the outside air or it may be delivered into the chamber 8 for mixing with the incoming air immediately before its entrance into the treated housing 1. Suitable dampers 18 and 19 are provided and may be operated in any suitable manner for directing the repassed air either into the chamber 8 or through the outlet 16 into the return duct 9. The repass duct 14 is closed completely so that the repassed air does not contact or mingle with any outside air and is delivered to the inlet side of the treated housing or chamber 1 at substantially the temperature and humidity which is desired for the air in the enclosure A, and as a consequence this air mingling with the return air and the incoming fresh air will lower the temperature of this return and fresh air with the result that a smaller drop in the temperature is necessary since a part of this cooling has been done by pre-mixing, thus rendering or decreasing the effective depth of the cooling coil 2 in proportion to the quantity of repassed air, which is the usual requirement necessary to maintain the desired conditions in the enclosure A under the average load characteristics that are met in the practice.

The term "effective depth" is used throughout the specification to mean the depth of the coil which is effective to reduce the temperature of the air to the temperature of the coil. For example, let us say that the temperature of the air in the duct 8 is 75° F., the temperature in the coil 2 40° F., and that no air is being repassed. Assuming then that it takes three-quarters of the depth of the coil to reduce the air actually contacting the coil to 40° F., the effective depth would be three-quarters of the coil depth. Then, if some air were repassed, the temperature of the air in the duct 8 would be lowered and the 40° F. temperature reached at an earlier point in the path of travel, and thus the effective depth of the coil would be lessened.

Control of the quantity of air repassed through the closed repass duct 14 is provided through the medium of a conditioned air controller 20, of approved type which can now be purchased on the market. This conditioned air controller 20 is placed in the enclosure A and in turn controls the operation of a damper actuating motor 21, also of any approved type. The motor 21 actuates a damper 22 placed in the repass duct 14. The damper is therefore sensitive to varying temperature and/or humidities in the enclosure A and controls the quantity of air repassed in direct proportion to variation from the desired conditions in the enclosure A. A damper 23 is positioned in the conditioned air supply duct 11 and if it is so desired this damper 23 may be connected, as indicated at 24, either with the damper 22 or the motor 21 so that the conditioned air passing through the supply duct 11 will also be controlled by the conditioned air controller 20. However, if it is so desired this damper 23 may be eliminated or may be controlled in any other suitable manner than that illustrated. It is also to be understood that either of the outlets 15 or 16 for the repass duct may be eliminated without departing from the spirit of the present invention.

The supply line 24' for supplying the refrigerant to the coil 2 has a refrigerant control valve 25 therein by means of which the circulation of the refrigerant through the coil 2 may be regulated as desired.

In operation, assuming that the damper 18 is closed and the damper 19 open, permitting the repass duct 14 to open direct into the return air duct 9. With the apparatus operating under maximum load conditions the damper 22 will be closed and all air conditioned in the conditioning chamber or housing 1 will be discharged through the conditioned air supply duct 11 into the enclosure A. When the heat or moisture load in the enclosure A changes, the conditioned air controller 20 will function to gradually open the damper 22 and a part of the air leaving the fan 10 will be passed through the repass duct 14 into the return air duct 9 and consequently to the intake side of the conditioning system, thereby missing the enclosure A and consequently being unaffected by the conditions within the enclosure and it will enter the duct 9 at substantially the humidity and temperature at which it is discharged from the fan 10. This will reduce the volume of air delivered to the enclosure A and such reduction of air will be responsive to the action of the conditioned air controller 20; therefore a substantially constant temperature and/or humidity will be maintained in the enclosure A. The conditioned or cooled air repassed will, upon entering the duct 9 pre-cool the conditioned air which is discharged from the enclosure A through the duct 9 and therefore this pre-cooled mixed air entering the duct 6 will mix with incoming fresh air so that the air mixture entering the cooling or conditioning chamber or housing 1 will have been reduced in temperature and/or moisture content. With the temperature of the refrigerant passing through the coil 2 being maintained the same as under maximum load, the amount of work actually done will be slightly less, but the mixing of the repassed conditioned air with the incoming fresh and return air will cause the temperature and/or moisture content of the air leaving the cooling element to be changed and in most instances lowered. The air velocity through the cooling or conditioning chamber 1 will not have been reduced but will tend to increase slightly due to the lowering of the pressure on the fan 10 since with a given temperature differential, in a heat transfer system, the heat transmitted will increase depending upon the increase of the velocity of the air over the surface. Therefore, in the particular case just outlined, the transfer co-efficient would tend to increase slightly.

The damper 22, of course opens wider as the demand for conditioned air in the enclosure A decreases with the resultant increase in the quantity of repassed conditioned air and a resultant co-operative action of the cooling coil 2 is provided. The same conditions and features of operation would result if the damper 18 were opened and the damper 19 closed excepting only that the repassed air would mix with the return air and the incoming fresh air after these two had been mixed in contradistinction to mixing with the return air prior to its contact or mixing with the incoming fresh air.

It may be desirable in some installations to repass some of the air at all times, and in installations where this is desirable, the dampers 22 and 23 will be so set and regulated as to permit a part of the air to be repassed at all times.

The system and apparatus as above described will provide a definite improvement in cooling coil or cooling element efficiency under reduced load conditions; that is, it will provide definite improvement in the efficiency of the refrigerant coil as the requiremets for conditioned air in the enclosure A are reduced. Due to this higher efficiency, it is possible to prevent the increase in relative humidity in the enclosure A at a given temperature during off-peak load conditions that many systems experience. It is even possible to maintain a constant humidity with a falling temperature in the room and a constant cooling element temperature. In the normal comfort cooling installation which use metal surfaces or coils and direct expansion refrigerant, the present practice is to design the coil and air capacity for maximum load conditions. Under off-peak load conditions, with such a system as is at present available, it is not possible to keep the back pressure of the refrigeration system up near the condition for which the apparatus was designed and at the same time maintain the desired conditions in the enclosure A or comfort zone, and consequently as the volume of conditioned air is reduced through the cooling element the refrigerant temperature must drop at a rapid rate in order to maintain desired or suitable room conditions. This last mentioned arrangement may be possible in approved systems now in use due to the fact that the back pressure drops to the freezing point or the capacity of the refrigerating machine is so reduced that it can not carry the load under the off-peak conditions, thereby resulting in variation from the desired temperature and humidity conditions in the enclosure A. With the present system the above enumerated undesirable features are overcome since the effective coil depth of the refrigerant coil is increased in proportion to the quantity of the conditioned air repassed, thereby providing a structure which will maintain the comfort conditions in the enclosure A under the average variances in load characteristics that are met within the trade.

The present apparatus has a further distinct advantage in that with this regulation of the effective coil depth and the repassing of the conditioned air, which in turn controls the quantity of conditioned air delivered to the enclosure to be treated a relatively wide range is permitted in the use of the apparatus to provide ideal conditions in the enclosure thereby permitting standardized manufacture of the equipment with the resultant reduction in its cost.

While in the foregoing description and in the drawing a particular method and apparatus has been described and illustrated, it is to be understood that variations in the arrangement of the apparatus may be provided since obviously a number of arrangements are possible utilizing the inventive principle of the present air conditioning system, and it is therefore to be understood that the invention is not to be limited to the specific construction or arrangement of parts shown but that they may be widely modified within the invention defined by the claims.

What is claimed is:

1. In an air conditioning system including an enclosure to be cooled, a conditioning chamber, a duct for delivering conditioned air from said chamber to said enclosure, a refrigerant coil in said chamber, a duct for conveying fresh and return air to said chamber, and means for varying the effective depth of said refrigerant coil comprising a duct for conveying part of the conditioned air from said delivery duct into said conditioning chamber at a point nearer the coil than the entrance point of fresh and return air into said conveying duct.

2. In an air conditioning system including an enclosure to be cooled, a conditioning chamber, a duct for delivering conditioned air from said chamber to said enclosure, a refrigerant coil in said chamber, a duct for conveying fresh and return air to said chamber, means for varying the effective depth of said refrigerant coil comprising a duct for conveying part of the conditioned air from said delivery duct into said conditioning chamber at a point nearer the coil than the entrance point of fresh and return air into said conveying duct, and means automatically controlled by air conditions in said enclosure for regulating the quantity of conditioned air returned to said conditioning chamber.

3. In an air conditioning system including an enclosure to be cooled, a conditioning chamber, a duct for delivering conditioned air from said chamber to said enclosure, a refrigerant coil in said chamber, a duct for conveying fresh and return air to said chamber, means for varying the effective depth of said refrigerant coil comprising a duct for conveying part of the conditioned air from said delivery duct into said conditioning chamber at a point nearer the coil than the entrance point of fresh and return air into said conveying duct, and a duct for conducting conditioned air from the delivery duct for mingling with return air prior to its entrance into said conveying duct.

4. In an air conditioning system including an enclosure to be cooled, a conditioning chamber, a duct for delivering conditioned air from said chamber to said enclosure, a refrigerant coil in said chamber, a duct for conveying fresh and return air to said chamber, means for varying the effective depth of said refrigerant coil comprising a duct for conveying part of the conditioned air from said delivery duct into said conditioning chamber at a point nearer the coil than the entrance point of fresh and return air into said conveying duct, a duct for conducting conditioned air from the delivery duct for mingling with return air prior to its entrance into said conveying duct, and control dampers in the ducts for conveying conditioned air to said conditioning chamber and for mingling with the return air.

5. In an air conditioning system including an enclosure to be cooled, a conditioning chamber, a duct for delivering conditioned air from said chamber to said enclosure, a refrigerant coil in said chamber, a duct for conveying fresh and return air to said chamber, means for varying the effective depth of said refrigerant coil comprising a duct for conveying part of the conditioned air from said delivery duct into said conditioning chamber at a point nearer the coil than the entrance point of fresh and return air into said conveying duct, a duct for conducting conditioned air from the delivery duct for mingling with return air prior to its entrance into said conveying duct, control dampers in the ducts for conveying conditioned air to said conditioning chamber and for mingling with the return air, and means automatically controlled by air conditions in said enclosure for regulating the quantity of conditioned air passing through said conditioned air delivery ducts.

6. In an air conditioning apparatus, a housing having an inlet for air to be conditioned and an outlet for conditioned air, air conditioning means arranged in said housing and including a refrigerant coil, a supply duct for delivering conditioned air to an enclosure to be treated, a return air duct for returning air from the enclosure, an incoming air duct leading to the housing and being open to receive fresh air for delivery to the housing, said return air duct having communication with said incoming air duct, and a closed repass duct leading from said supply duct to said incoming duct for repassing a portion of the conditioned air from the supply duct to the incoming air duct, said repass duct having a branch opening into said return air duct, and dampers in said repass duct for the controlling of the delivery of repassed air either into the return air duct or into the incoming air duct.

7. In an air conditioning apparatus, a housing having an inlet for air to be conditioned and an outlet for conditioned air, air conditioning means arranged in said housing and including a refrigerant coil, a supply duct for delivering conditioned air to an enclosure to be treated, a return duct for returning air from the enclosure, an incoming air duct leading to the housing and being open to receive fresh air for delivery to the housing, said return air duct having communication with said incoming air duct, a closed repass duct leading from said supply duct to said incoming duct for repassing a portion of the conditioned air from the supply duct to the incoming air duct, said repass duct having a branch opening into said return air duct, dampers in said repass duct for the controlling of the delivery of repassed air either into the return air duct or into the incoming air duct, and means responsive to conditions in the enclosure for regulating the quantity of conditioned air repassed.

THOMAS J. ATKINS.